(12) United States Patent
Woodman et al.

(10) Patent No.: US 7,431,980 B2
(45) Date of Patent: Oct. 7, 2008

(54) COMPOSITE THERMOPLASTIC SHEETS INCLUDING NATURAL FIBERS

(75) Inventors: Daniel Scott Woodman, Lynchburg, VA (US); Venkat Krishna Raghavendran, Forest, VA (US); John Joseph McHugh, Lynchburg, VA (US)

(73) Assignee: Azdel, Inc., Forest, VA (US)

( * ) Notice: Subject to any disclaimer, the term of this patent is extended or adjusted under 35 U.S.C. 154(b) by 279 days.

(21) Appl. No.: 10/983,535

(22) Filed: Nov. 8, 2004

(65) Prior Publication Data

US 2006/0099393 A1      May 11, 2006

(51) Int. Cl.
*B32B 13/02* (2006.01)

(52) U.S. Cl. ............... 428/297.4; 428/300.7; 428/317.9

(58) Field of Classification Search ................ 428/303, 428/297.4, 300.7, 317.9; 156/245; 442/30, 442/35, 56, 57, 413, 416; 264/41, 322
See application file for complete search history.

(56) References Cited

U.S. PATENT DOCUMENTS

| | | | |
|---|---|---|---|
| 4,508,499 A * | 4/1985 | Spengler | 425/88 |
| 4,519,766 A * | 5/1985 | Spengler | 425/302.1 |
| 4,634,483 A * | 1/1987 | Spengler | 156/216 |
| 4,670,331 A | 6/1987 | Radvan et al. | |
| 4,717,143 A * | 1/1988 | Spengler | 271/267 |
| 4,734,321 A | 3/1988 | Radvan et al. | |
| 5,009,747 A | 4/1991 | Viazmensky et al. | |
| 5,147,345 A * | 9/1992 | Young et al. | 604/378 |
| 5,151,320 A | 9/1992 | Homonoff et al. | |
| 5,306,739 A * | 4/1994 | Lucey | 522/42 |
| 5,413,661 A * | 5/1995 | Spengler et al. | 156/515 |
| 5,437,919 A | 8/1995 | Welich et al. | |
| 5,502,088 A * | 3/1996 | Hododi | 524/34 |
| 5,614,285 A * | 3/1997 | Gardill | 428/156 |
| 5,709,925 A * | 1/1998 | Spengler et al. | 428/198 |
| 5,718,791 A * | 2/1998 | Spengler | 156/212 |
| 5,780,519 A * | 7/1998 | Imoto | 521/68 |
| 5,866,051 A * | 2/1999 | Lin et al. | 264/45.9 |
| 5,942,321 A * | 8/1999 | Romesberg et al. | 428/300.7 |
| 6,287,678 B1 * | 9/2001 | Spengler | 428/297.4 |
| 6,610,904 B1 * | 8/2003 | Thomas et al. | 604/383 |
| 6,762,138 B2 | 7/2004 | Ferreira et al. | |
| 7,244,501 B2 * | 7/2007 | Raghavendran et al. | 428/412 |
| 2004/0231915 A1 * | 11/2004 | Thompson et al. | 181/290 |

FOREIGN PATENT DOCUMENTS

| | | |
|---|---|---|
| EP | 0 319 589 B1 | 11/1995 |
| JP | 62157782 | 6/1987 |
| WO | WO96/12849 | 5/1996 |

* cited by examiner

*Primary Examiner*—N Edwards
(74) *Attorney, Agent, or Firm*—Armstrong Teasdale LLP

(57) ABSTRACT

A composite sheet material includes, in an exemplary embodiment a porous core that includes at least one thermoplastic material and from about 20 weight percent to about 80 weight percent of natural fibers based on a total weight of the porous core. The natural fibers include at least one of kenaf fibers, jute fibers, flax fibers, hemp fibers, cellulosic fibers, sisal fibers, and coir fibers.

14 Claims, 1 Drawing Sheet

US 7,431,980 B2

COMPOSITE THERMOPLASTIC SHEETS INCLUDING NATURAL FIBERS

BACKGROUND OF THE INVENTION

This invention relates generally to porous fiber reinforced thermoplastic polymer sheets, and more particularly to porous fiber reinforced thermoplastic polymer sheets that include natural fibers.

Porous fiber reinforced thermoplastic sheets have been described in U.S. Pat. Nos. 4,978,489 and 4,670,331 and are used in numerous and varied applications in the product manufacturing industry because of the ease of molding the fiber reinforced thermoplastic sheets into articles. Known techniques, for example, thermo-stamping, compression molding, and thermoforming have been used to successfully form articles from fiber reinforced thermoplastic sheets.

Porous fiber reinforced thermoplastic sheets are sometimes formed into decorative interior panels for use in the interior of automobiles, mass transit vehicles, and buildings including commercial buildings and private buildings. Incineration of these decorative panels upon the end of their useful life is made impractical because of the presence of glass fibrous reinforcements.

BRIEF DESCRIPTION OF THE INVENTION

In one aspect, a composite sheet material is provided. The composite sheet material includes a permeable core that includes discontinuous natural fibers bonded together with a thermoplastic resin. The permeable core has a density from about 0.1 gm/cc to about 1.8 gm/cc, and includes a surface region.

In another aspect, a composite sheet material is provided that includes a porous core. The porous core includes at least one thermoplastic material and from about 20 weight percent to about 80 weight percent of natural fibers based on a total weight of the porous core. The natural fibers include at least one of kenaf fibers, jute fibers, flax fibers, hemp fibers, cellulosic fibers, sisal fibers, and coir fibers.

In another aspect, a method of fabricating a porous, natural fiber-reinforced thermoplastic sheet is provided. The method includes adding natural fibers having an average length of about 5 mm to about 50 mm, and thermoplastic resin powder particles to an agitated aqueous foam to form a dispersed mixture, laying the dispersed mixture of natural fibers and thermoplastic resin particles down onto a wire mesh, evacuating the water to form a web, heating the web above the glass transition temperature of the thermoplastic resin, and pressing the web to a predetermined thickness to form a porous thermoplastic composite sheet having a void content of about 1 percent to about 95 percent of the volume of the composite sheet.

DETAILED DESCRIPTION OF THE INVENTION

Figure 1:
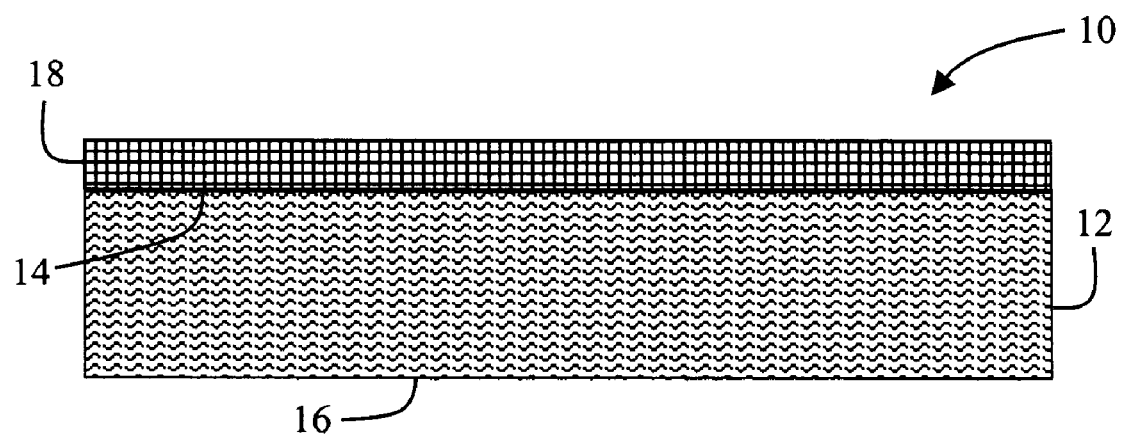
FIG. 1 is sectional illustration of a composite plastic sheet in accordance with an embodiment of the present invention.

A porous composite thermoplastic sheet containing natural fibers as reinforcement is described below in detail. Natural fiber is selected from variants that offer good dispersion and drainage characteristics in an aqueous foam. Natural fiber reinforcement provides environmental advantages over composite sheets having, for example, glass fiber reinforcement, such as, clean incineration at the end of useful life, and recycle possibilities. Natural fiber reinforcement also provides weight reduction in comparison to glass fibers.

Referring to the drawing, FIG. 1 is a cross sectional schematic illustration of an exemplary composite thermoplastic sheet 10 that includes a porous core 12 having a first surface 14 and a second surface 16. A decorative skin 18 is bonded to first surface 14. In alternate embodiments, skins and/or barrier layers are bonded to second surface 16. decorative skin 18 may be at least one of a thermoplastic film an elastomeric film, a metal foil, a thermosetting coating, an inorganic coating, a fiber based scrim, a non-woven fabric, and a woven fabric.

Core 12 is formed from a web made up of open cell structures formed by random crossing over of reinforcing natural fibers held together, at least in part, by one or more thermoplastic resins, where the void content of porous core 12 ranges in general between about 1% and about 95% and in particular between about 30% and about 80% of the total volume of core 12. In another embodiment, porous core 12 is made up of open cell structures formed by random crossing over of reinforcing fibers held together, at least in part, by one or more thermoplastic resins, where about 40% to about 100% of the cell structure are open and allow the flow of air and gases through. Core 12 has a density in one embodiment of about 0.1 gm/cc to about 1.8 gm/cc and in another embodiment about 0.3 gm/cc to about 1.0 gm/cc. Core 12 is formed using known manufacturing process, for example, a wet laid process, an air laid process, a dry blend process, a carding and needle process, and other known process that are employed for making non-woven products. Combinations of such manufacturing processes are also useful.

Core 12 includes about 20% to about 80% by weight of natural fibers having an average length of between about 5 mm and about 50 mm, and about 20% to about 80% by weight of a wholly or substantially unconsolidated fibrous or particulate thermoplastic materials, where the weight percentages are based on the total weight of core 12 In another embodiment, core 12 includes about 30% to about 55% by weight of natural fibers. In another embodiment, core 12 includes natural fibers having an average length of between about 5 mm and about 25 mm. Suitable natural fibers include, but are not limited to kenaf fibers, jute fibers, flax fibers, hemp fibers, cellulosic fibers, sisal fibers, coir fibers, and mixtures thereof.

In the exemplary embodiment, natural fibers having an average length of about 5 mm to about 50 mm is added with thermoplastic powder particles, for example polypropylene powder, to an agitated aqueous foam which can contain a surfactant. The components are agitated for a sufficient time to form a dispersed mixture of the natural fibers and thermoplastic powder in the aqueous foam. The dispersed mixture is then laid down on any suitable support structure, for example, a wire mesh and then the water is evacuated through the wire mesh forming a web. The web is dried and heated above the softening temperature of the thermoplastic powder. The web is then cooled and pressed to a predetermined thickness to produce a composite sheet having a void content of between about 1 percent to about 95 percent. In an alternate embodiment, the aqueous foam also includes a binder material.

The web is heated above the softening temperature of the thermoplastic resins on core 12 to substantially soften the plastic materials and is passed through one or more consolidation devices, for example calendaring rolls, double belt laminators, indexing presses, multiple daylight presses, autoclaves, and other such devices used for lamination and consolidation of sheets and fabrics so that the plastic material can flow and wet out the fibers. The gap between the consolidating elements in the consolidation devices are set to a dimension less than that of the unconsolidated web and greater than that of the web if it were to be fully consolidated, thus allowing the web to expand and remain substantially permeable after passing through the rollers. In one embodiment, the gap is set to a dimension about 5% to about 10% greater than that of the web if it were to be fully consolidated. A fully consolidated web means a web that is fully compressed and substantially void free. A fully consolidated web would have less than 5% void content and have negligible open cell structure.

In another embodiment, core 12 also includes up to about 10 percent of inorganic fibers for added stiffness and or improved lofting. The inorganic fibers can include, for example, metal fibers, metalized inorganic fibers, metalized synthetic fibers, glass fibers, graphite fibers, carbon fibers, ceramic fibers, mineral fibers, basalt fibers, inorganic fibers, aramid fibers, and mixtures thereof.

Particulate plastic materials include short plastics fibers which can be included to enhance the cohesion of the web structure during manufacture. Bonding is affected by utilizing the thermal characteristics of the plastic materials within the web structure. The web structure is heated sufficiently to cause the thermoplastic component to fuse at its surfaces to adjacent particles and fibers.

In one embodiment, individual reinforcing fibers should not on the average be shorter than about 5 millimeters, because shorter fibers do not generally provide adequate reinforcement in the ultimate molded article. Also, fibers should not on average be longer than about 50 millimeters since such fibers are difficult to handle in the manufacturing process.

In one embodiment, in order to confer structural strength the natural fibers have an average diameter between about 7 and about 22 microns. Fibers of diameter less than about 7 microns can easily become airborne and can cause environmental health and safety issues. Fibers of diameter greater than about 22 microns are difficult to handle in manufacturing processes and do not efficiently reinforce the plastics matrix after molding.

In one embodiment, the thermoplastics material is, at least in part, in a particulate form. Suitable thermoplastics include, but are not limited to, polyolefins, including polymethylene, polyethylene, and polypropylene, polystyrene, acrylonitrylstyrene, butadiene, polyesters, including polyethyleneterephthalate, polybutyleneterephthalate, and polypropyleneterephthalate, polybutyleneterachlorate, and polyvinyl chloride, both plasticised and unplasticised, acrylics, including polymethyl methacrylate, and blends of these materials with each other or other polymeric materials. Other suitable thermoplastics include, but are not limited to, polyarylene ethers, acrylonitrile-butylacrylate-styrene polymers, amorphous nylon, as well as alloys and blends of these materials with each other or other polymeric materials. It is anticipated that any thermoplastics resin can be used which is not chemically attacked by water and which can be sufficiently softened by heat to permit fusing and/or molding without being chemically or thermally decomposed.

The thermoplastic particles need not be excessively fine, but particles coarser than about 1.5 millimeters are unsatisfactory in that they do not flow sufficiently during the molding process to produce a homogenous structure. The use of larger particles can result in a reduction in the flexural modulus of the material when consolidated.

The porous composite thermoplastic sheets containing natural fibers as reinforcement described above can be used in, but not limited to, building infrastructure, automotive headliners, door modules, side wall panels, ceiling panels, cargo liners, office partitions, and other such applications that are currently made with polyurethane foam, polyester fiber filled multi-layered composites, and thermoplastic sheets. The porous composite thermoplastic sheets containing natural fibers as reinforcement can be molded into various articles using methods known in the art, for example, pressure forming, thermal forming, thermal stamping, vacuum forming, compression forming, and autoclaving. Natural fiber reinforcement provides environmental advantages over composite sheets having, for example, glass fiber reinforcement, such as, clean incineration at the end of useful life, and recycle possibilities. Natural fiber reinforcement also provides weight reduction in comparison to glass fibers.

While the invention has been described in terms of various specific embodiments, those skilled in the art will recognize that the invention can be practiced with modification within the spirit and scope of the claims.

What is claimed is:

1. A thermoplastic composite sheet material comprising:
   a permeable core comprising a thermoplastic resin material reinforced with a web of reinforcing fibers, and discontinuous natural fibers, said permeable core having a density from about 0.1 gm/cc to about 1.8 gm/cc, said permeable core including a surface region, said composite sheet moldable into predetermined shapes;
   said natural fibers selected from the group consisting of kenaf fibers, jute fibers, flax fibers, hemp fibers, sisal fibers, coir fibers, and mixtures thereof.

2. A composite sheet material in accordance with claim 1 wherein said permeable core has an open cell structure with a void content of about 1 percent to about 95 percent of the total volume of said permeable core.

3. A composite sheet material in accordance with claim 1 wherein said permeable core comprises a thermoplastic resin selected from the group consisting of polyolefins, polystyrene, acrylonitryistyrene, butadiene, polyesters, polybutyleneterachlorate, polyvinyl chloride, polyphenylene ether, polycarbonates, polyestercarbonates, acrylonitrile-butylacrylate-styrene polymers, amorphous nylon, and mixtures thereof 4. A composite sheet material in accordance with claim 1 wherein said core comprises from about 20 to about 80 percent by weight of said natural fibers and reinforcing fibers, and from about 20 to about 80 percent by weight of said thermoplastic resin.

5. A composite sheet material in accordance with claim 1 wherein said core comprises from about 35 to about 55 percent by weight of said natural fibers and reinforcing fibers, and from about 45 to about 65 percent by weight of said thermoplastic resin.

6. A composite sheet material in accordance with claim 1 further comprising an adherent layer adjacent to said surface region.

7. A composite sheet material according to claim 6 wherein said adherent adjacent layer comprises at least one of a thermoplastic film, an elastomeric film, a metal foil, a thermosetting coating, an inorganic coating, a fiber based scrim, a non-woven fabric, and a woven fabric.

8. A composite sheet material in accordance with claim 1 wherein said said reinforcing fibers comprise at least one of metal fibers, metalized inorganic fibers, metalized synthetic fibers, glass fibers, graphite fibers, carbon fibers, ceramic fibers, basalt fibers, inorganic fibers, and aramid fibers.

9. A composite sheet material comprising:
   a porous core comprising at least one thermoplastic material reinforced with a web of reinforcing fibers and discontinuous natural fibers, comprising from about 20 weight percent to about 80 weight percent of reinforcing fibers and natural fibers based on a total weight of said porous core layer, said permeable core having a density from about 0.1gm/cc to about 1.8 gm/cc, said natural fibers selected from the group consisting of kenaf fibers, jute fibers, flax fibers, hemp fibers, sisal fibers, coir fibers, and mixtures thereof, said composite sheet moldable into predetermined shapes.

10. A composite sheet material in accordance with claim 9 wherein said porous core has an open cell structure with a void content of about 1 percent to about 95 percent of the total volume of said porous core.

11. A composite sheet material in accordance with claim 9 wherein said porous core comprises a thermoplastic resin selected from the group consisting of polyolefins, polystyrene, acrylonitrylstyrene, butadiene, polyesters, polybutyleneterachlorate, polyvinyl chloride, polyphenylene ether, polycarbonates, polyestercarbonates, acrylonitrile-butylacrylate-styrene polymers, amorphous nylon, and mixtures thereof.

12. A composite sheet material in accordance with claim 9 wherein said porous core comprises from about 35 to about 55 percent by weight of said natural fibers and reinforcing fibers, and from about 45 to about 65 percent by weight of said thermoplastic resin.

13. A composite sheet material in accordance with claim 9 further comprising at least one skin, each said skin covering at least a portion of a surface of said porous core layer, said skin comprising at least one of a thermoplastic film, an elastomeric film, a metal foil, a thermosetting coating, an inorganic coating, a fiber based scrim, a non-woven fabric, and a woven fabric.

14. A composite sheet material in accordance with claim 9 wherein said reinforcing fibers comprise at least one of metal fibers, metalized inorganic fibers, metalized synthetic fibers, glass fibers, graphite fibers, carbon fibers, ceramic fibers, basalt fibers, inorganic fibers, and aramid fibers.

* * * * *